Dec. 11, 1962 D. J. HINKEIN ET AL 3,067,937

CONTROL ELEMENT FOR COMPUTING DEVICES

Filed June 8, 1959 8 Sheets-Sheet 1

INVENTORS
DONALD J. HINKEIN
WARREN W. MARTIN

BY Thomas & Crickenberger

ATTORNEYS

Dec. 11, 1962 D. J. HINKEIN ETAL 3,067,937

CONTROL ELEMENT FOR COMPUTING DEVICES

Filed June 8, 1959 8 Sheets-Sheet 2

INVENTORS
DONALD J. HINKEIN
WARREN W. MARTIN

BY Thomas & Crickenberger

ATTORNEYS

CONTROL ELEMENT FOR COMPUTING DEVICES
Fig. 3.
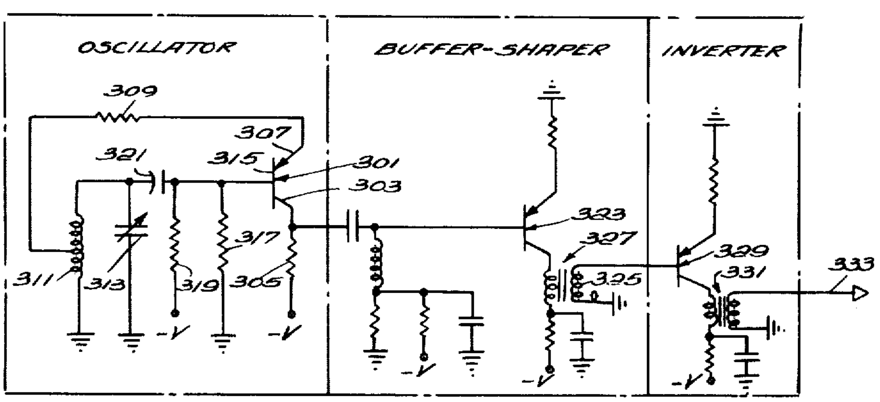
Fig. 4.
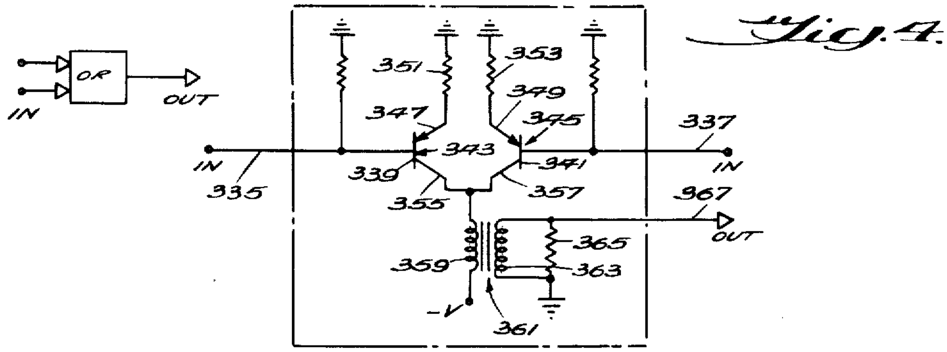
Fig. 5.
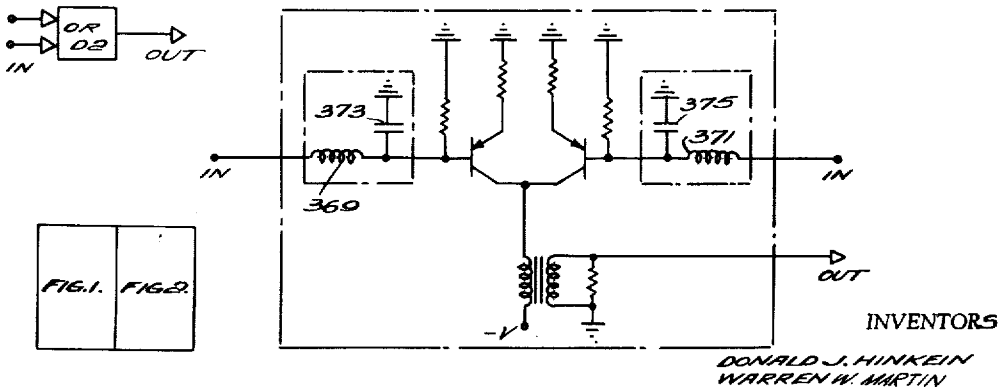
Fig. 2a.
INVENTORS
DONALD J. HINKEIN
WARREN W. MARTIN
BY Thomas & Crickenberger
ATTORNEYS

INVENTORS
DONALD J. HINKEIN
WARREN W. MARTIN

BY Thomas & Crickenberger
ATTORNEYS

INVENTORS
DONALD J. HINKEIN
WARREN W. MARTIN

BY Thomas & Crickenberger
ATTORNEYS

CONTROL ELEMENT FOR COMPUTING DEVICES

Filed June 8, 1959 8 Sheets-Sheet 6

INVENTORS
DONALD J. HINKEIN
WARREN W. MARTIN

BY Thomas & Crickenberger
ATTORNEYS

INVENTORS
DONALD J. HINKEIN
WARREN W. MARTIN

BY Thomas & Crickenberger
ATTORNEYS

Dec. 11, 1962 D. J. HINKEIN ETAL 3,067,937

CONTROL ELEMENT FOR COMPUTING DEVICES

Filed June 8, 1959 8 Sheets-Sheet 8

INVENTORS
DONALD J. HINKEIN
WARREN W. MARTIN

BY Thomas & Crickenberger

ATTORNEYS

United States Patent Office 3,067,937
Patented Dec. 11, 1962

3,067,937

CONTROL ELEMENT FOR COMPUTING DEVICES

Donald J. Hinkein, Germantown, and Warren W. Martin, Wappingers Falls, N.Y., assignors to International Business Machines Corporation, New York, N.Y., a corporation of New York Filed June 8, 1959, Ser. No. 818,896
8 Claims. (Cl. 235—157)

This invention relates to a control element for computing devices and more particularly to a control element for generating electrical pulses which operates a computing device and cause it to perform given instructions.

In earlier types of computing devices the control element for generating signals to operate the computer was controlled by D.C. level signals. These D.C. level signals were always present when the computer was being operated and hence represented a constant power loss. Furthermore, D.C. level equipment was comparatively slow in operation and restricted the speed at which a computer could be operated. Customarily, the D.C. levels were applied to gates which in turn received pulse signals in a timed relationship, and the gates provided output pulses, commonly called command pulses, which operated the computer. The time spaced pulses were provided by a time pulse distributor which, once turned on, usually ran through a fixed cycle of operation and supplied pulses to the gate circuits. Where the cycle or period of operation of the time pulse distributor was fixed, the time for executing the various instructions was likewise fixed. Having the period of each instruction take the same amount of time for execution presented a disadvantage when some instructions could be executed in a shorter period of time.

The foregoing disadvantages are overcome according to the present invention which provides a control device for manipulating a computer wherein the period of time for executing a given instruction is fixed, but the period of time for different instructions varies with the minimum requirement of each. In other words, the period of time required for each instruction varies with the minimum requirement of each instruction, resulting in a saving of time over the fixed period instruction cycle of earlier machines whereby valuable computer time is saved and the number of instructions which may be performed in a given period of time is increased.

According to a further feature of this invention, a control element for a computing device is provided which operates entirely from pulse signals, as distinguished from D.C. level signals, and the speed of operation of a computing device may thereby be increased. The pulse type operation results in reduced power consumption over the earlier type D.C. level equipment.

In one illustrative arrangement according to this invention, signals representative of binary information are applied to a decoding device which selects and energizes one of a plurality of output conductors with a pulse. Each of the output conductors is connected to a corresponding stage of an instruction register, and the pulsed conductor causes the corresponding stage to be operated. The stage thus operated is said to be set. This stage is sampled periodically and an output pulse is provided to a sequence generator. One sequence generator is provided for each stage of the instruction register, and each sequence generator receives time spaced pulses from a time pulse distributor. The selected stage of the instruction register is periodically sampled and an output pulse provided in synchronism with the time spaced pulses of the time pulse distributor. The sequence generator includes a plurality of gates which are sequentially pulsed by the time pulse distributor. The selected sequence generator thereby supplies output pulses, called command pulses, to a computing device. The number of gates in each sequence generator varies with the number of command pulses which it is desired to generate. Each sequence generator represents a given instruction, and when selected, each sequence generator supplies only the number of command pulses required by the instruction it represents. The last command pulse from each sequence generator is used to clear the instruction register, reset the time pulse distributor, and initiate the transfer of new data representative of the next instruction. Thus as one instruction is completed, the next instruction is initiated, and instructions may be successively performed which vary in time duration, thereby providing a saving in execution time over the earlier types of computing devices which employed instructions of fixed time duration.

These and other features of this invention may be more fully appreciated when considered in the light of the following specification and drawings in which:

FIGS. 1 and 2 illustrate in block form a system according to the present invention;

FIG. 2*a* shows how FIGS. 1 and 2 should be arranged;

FIG. 3 is a diagram of the clock employed in FIGS. 1 and 2;

FIG. 4 illustrates an OR circuit shown in block form in FIG. 2;

FIG. 5 is a circuit diagram of an OR circuit illustrated in block form in FIG. 1;

Figure 1:
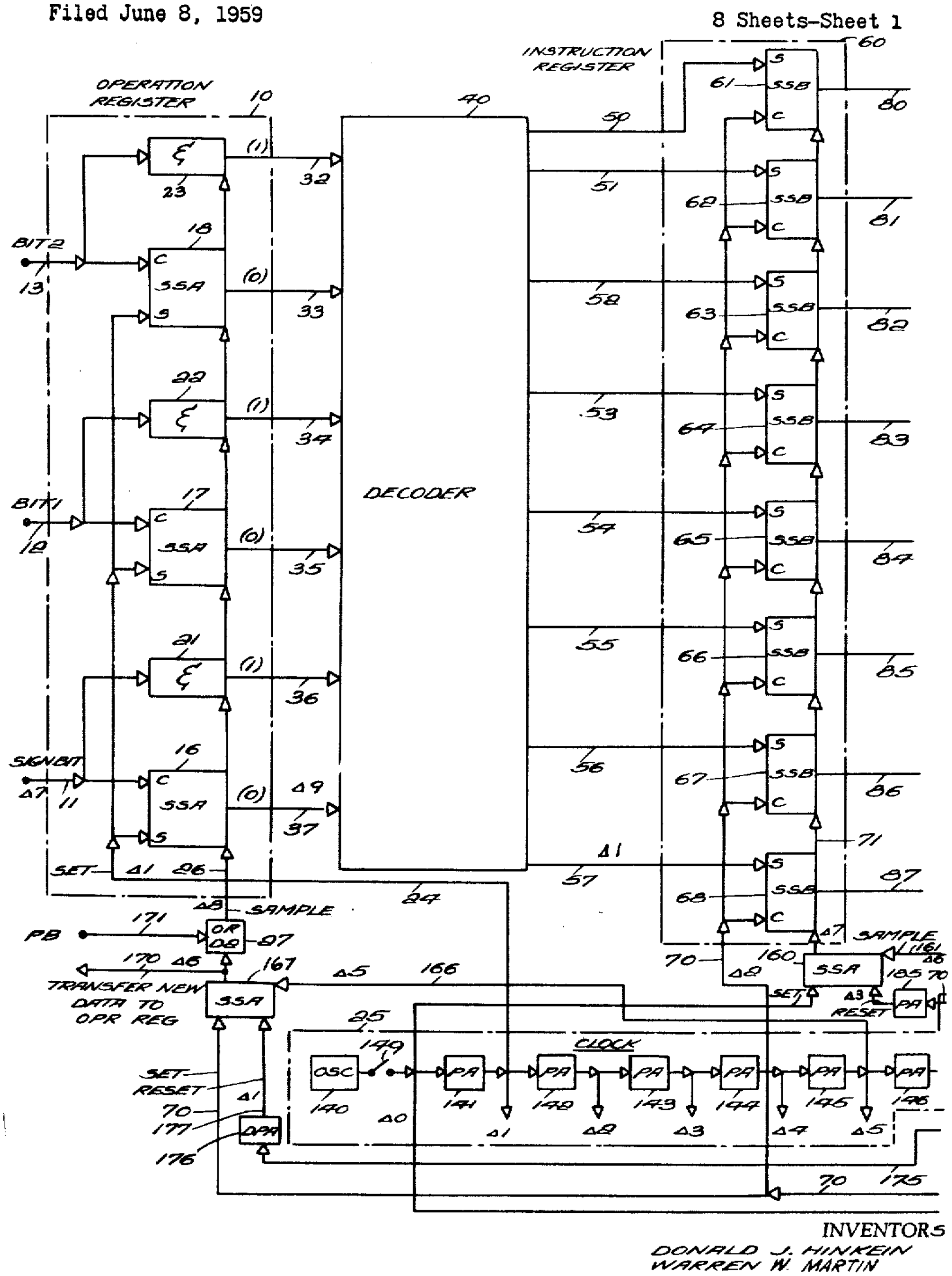
Figure 2:
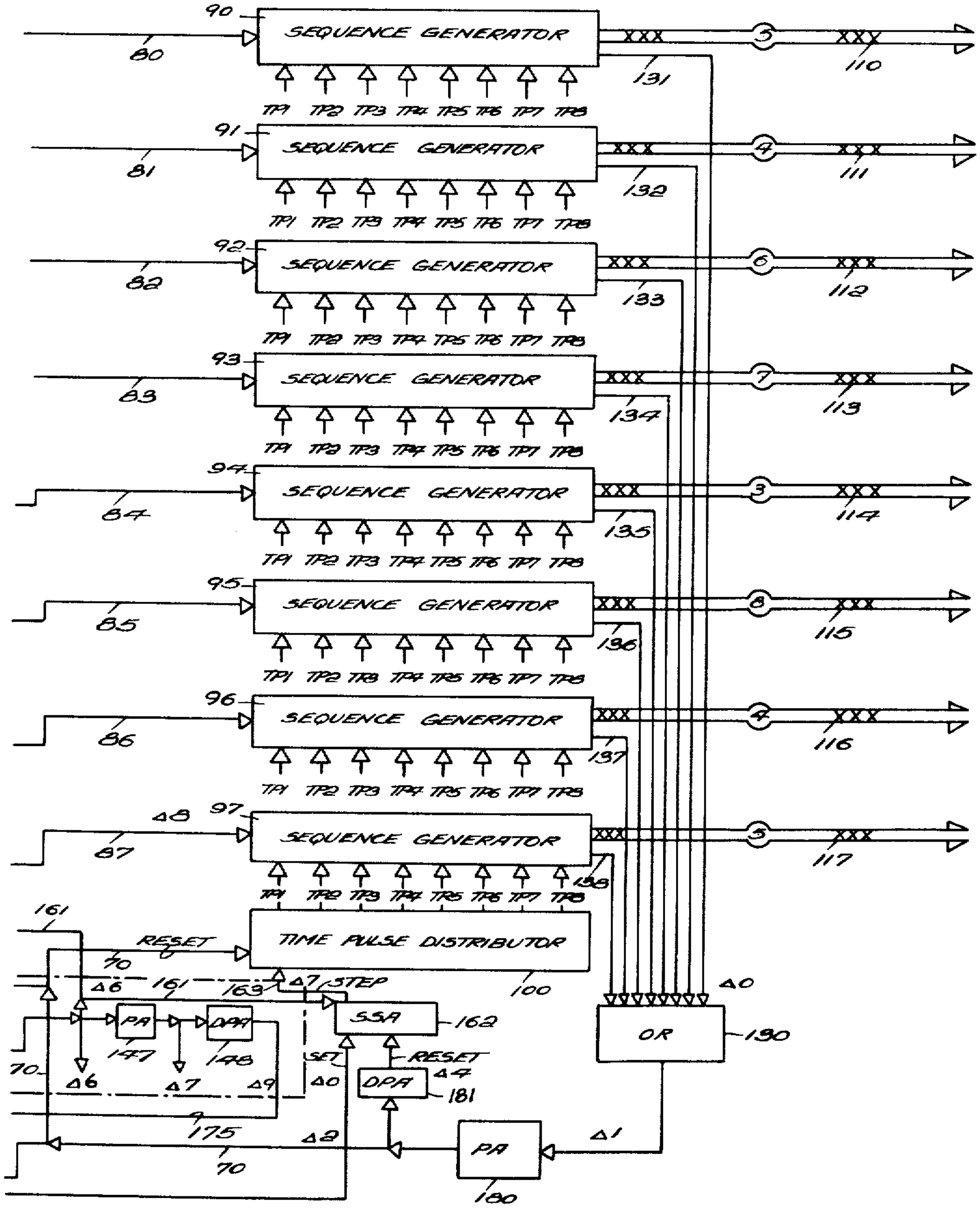

Referring to FIGS. 1 and 2, a preferred arrangement of this invention is illustrated in block form. FIGS. 1 and 2 should be arranged side by side as indicated in FIG. 2*a*. The circuits employed in the various blocks in FIGS. 1 and 2 are illustrated in the remaining figures of the drawing and are described subsequently. Referring more specifically to FIG. 1, instructions in the form of binary signals are applied to an operation register 10 through lines 11, 12 and 13. A negative pulse represents a binary one, and no signal or ground level represents a binary zero. These signals are applied to the clear terminals, designated as "*c*" on the drawing, of single storage circuits, type A (SSA) 16, 17 and 18. The input signals are also applied to time-buffer AND circuits 21, 22 and 23. The operation register 10 is set by a negative pulse on line 24 from a clock 25 at delta 1 time. The line 24 is connected to the set terminals, designated by the letter "*s*" in the drawing, of the single storage circuits 16, 17 and 18. The operation register 10 is sampled by a negative pulse on conductor 26 from an OR circuit 27. This sample pulse occurs at delta 8 time, and information pulses are supplied on conductors 32 through 37 at delta 9 time to a decoder 40. If each of the time-buffer AND circuits 21, 22 and 23 receives a negative input pulse before a negative sample pulse is applied to the line 26, then each time-buffer AND circuit provides a negative output pulse on corresponding conductors 32, 34 and 36 to the decoder 40. Negative pulses on these lines represent a binary one. If the single storage circuits 16, 17 and 18 are set by a negative pulse on the line 24 and no negative input pulse is applied to the clear terminal of these single storage circuits, then a negative sample pulse on the conductor 26 causes these single storage circuits to provide an output pulse on corresponding conductors 37, 35 and 33. In essence the information stored therein is destroyed by a sampling operation. The operation register 10 serves as a single to double line converter. For example, if the sign bit is a one, the line 11 receives a negative pulse, and this pulse clears the single storage circuit 16 and conditions the time-buffer AND circuit 21. A subsequent sample pulse on the conductor 26 causes the time-buffer AND circuit 21 to provide a negative pulse on the output conductor 36 representative of a binary one, and the single storage circuit 16 does not provide a negative pulse on output conductor 37 because it was cleared by the negative pulse on the input conductor 11. If the sign bit is a zero, then no signal or ground level is applied both to the time-buffer AND circuit 21 and to the clear terminal of the single storage circuit 16. The time-buffer AND circuit 21 is not conditioned and does not provide a negative output signal on the conductor 36 when the line 26 is sampled with a negative pulse. The single storage circuit 16, however, does provide a negative signal on the output conductor 37 when the line 26 is sampled because it was earlier set by a negative pulse on the line 24. Thus a negative signal on the output conductor 37 represents a binary zero in the sign bit. In like fashion when bit 1 is a one, the line 34 receives a negative pulse when the line 26 is sampled, and when bit 1 is a zero, the line 35 receives a negative pulse when the line 26 is sampled. Likewise, when the single storage circuit 18 and the time-buffer AND circuit 23 are sampled with a pulse on the line 26, the line 32 receives a negative pulse if bit 2 is a one, and the line 33 receives a negative pulse if bit 2 is a zero. The time at which the inputs to the operation register 10 are applied relative to one another is indicated arbitrarily on the lines associated with the sign bit of the opperation register 10 by delta plus a number. It is pointed out that the register 10 is set at delta 1 time, information applied thereto at delta 7 time, sampled at delta 8 time and output signals derived at delta 9 time.

The decoder 40 responds to various combinations of signals on the conductors 32 through 37 and provides a negative output pulse on a predetermined one of the conductors 50 through 57. By varying the combination of applied signals to the decoder 40, any one of the output conductors 50 through 57 may be selectively energized with a negative pulse.

An instruction register 60 is composed of single storage circuits, type B (SSB) labeled 61 through 68. These circuits are cleared by a negative pulse on a conductor 70 following the completion of an instruction. One of these circuits is set by a negative pulse on a selected one of the conductors 50 through 57 from the decoder 40. These single storage circuits are sampled by a negative pulse on a line 71, and the single storage circuit which was earlier set provides a negative signal on the associated one of the output conductors 80 through 87. The single storage circuit, type B provides a negative output signal on its associated output conductor each time it is sampled by a negative pulse provided it has been set by a negative pulse. The clear and set terminals are designated in the drawing by the letters "*c*" and "*s*," respectively. It is emphasized that once the single storage circuit, type B is set, it provides an output pulse each time it is sampled. In essence the information stored therein is not destroyed by sampling operations. The timing relationship as to when the input terminals to the instruction register are pulsed relative to one another is indicated on the input lines associated with the single storage circuit 68. The setting operation occurs at delta 1 time; the sampling operation occurs at delta 7 time; and the selected single storage circuit provides a negative output pulse at delta 8 time. The conductor 70 is pulsed at delta 2 time of the next clock cycle if the last command pulse has been generated, in which case a negative pulse from the decoder 40 sets a selected one of the single storage circuits 61 through 68 at delta 1 time of the succeeding clock cycle. The clear and set operations occur once for each instruction while the sample operations occur as many times as the number of command pulses to be generated for the given instruction.

The lines 80 through 87 in FIG. 1 are connected to corresponding sequence generators 90 through 97 in FIG. 2. As pointed out more fully hereinafter, each sequence generator includes a plurality of gates the number of which is determined by the number of command pulses required for a given instruction. Each gate is sequentially energized by pulses from a time pulse distributor 100, these pulses being applied to input conductors in each sequence generator designated TP1 through TP8. The output pulses from the gates in each sequence generator are command pulses which are supplied on individual output conductors disposed within a cable. The sequence generators 90 through 97 have corresponding output cables 110 through 117 associated therewith. The number of conductors in each cable is indicated by the number located within the semicircular portions in the central region of each cable. The last command pulse of each sequence generator is supplied to a conductor with the cable associated therewith, and it is also supplied to an OR circuit 130. The last command pulses of the sequence generators 90 through 97 are applied on corresponding conductors 131 through 138 to the OR circuit 130. It is emphasized at this point that each of the sequence generators 90 through 97 generates all the command pulses for a given instruction, and some instructions require more command pulses than other instructions. Note that the sequence generator 93 must generate 7 commands as indicated by the number 7 in the semicircular portions in the central region of the output cable 113 while the sequence generator 96 must generate only 4 pulses as indicated by the number in the semicircular portions of the central region of the cable 116. One of the sequence generators may be allotted the function of generating all command pulses for a multiply instruction, another sequence generator the function of generating all command pulses for an add instruction, another sequence generator the function of generating all command pulses for a subtract instruction, and each of the remaining sequence generators the function of generating all command pulses for different other instructions. Because some instructions may require a number of command pulses which is more or less than that of other instructions, this results in a variable length instruction cycle for the computing device. In each instance, however, the last command pulse generated by each instruction is applied to the OR circuit 130 in FIG. 2 on one of the conductors 131 through 138. The command pulses from the sequence generators 90 through 97 occur at delta zero time. The pulses on lines 131 through 138 are applied therefore at delta zero time to the OR circuit 130. The output pulse from the OR circuit 130 occurs at delta 1 time, and this pulse serves to reset the time pulse distributor 100 and thereby prevent the generation of further time pulses. The output pulse from the OR circuit 130 at delta 1 time serves also to clear the instruction register 60, thereby deselecting the sequence generator previously selected. The output pulse from the OR circuit at delta 1 time further serves to initiate the transfer of the next instruction signals to the operation register 10. Restated briefly, the last command pulse of a given instruction being executed is applied to the OR circuit 130 and serves to terminate the present instruction and initiate the next instruction. How this is accomplished is now described in further detail.

It is appropriate at this point to inquire into the operation of the clock 25 in FIGS. 1 and 2 and observe how it controls the operation of the operation register 10, the instruction register 60 and the time pulse distributor 100 which in turn controls, in conjunction with the instruction register 60, the operation of the sequence generators 90 through 97. The clock 25 includes an oscillator 140 which supplies pulse signals to power amplifiers 141 through 148 when a switch 149 is closed. The output pulses from the oscillator 140 are negative pulses which in one practical arrangement according to this invention occurred at 10 megacycles per second. The output pulse from the oscillator 140 is taken as a reference point in time, and the pulses here are said to occur at delta zero time. These pulses are supplied to a power amplifier 141 and delayed in transit therethrough for a given period of time; this period is arbitrarily designated as one delta period of time; and hence the pulses emerge at delta 1 time. The output pulse from the power amplifier 141 is supplied to the power amplifier 142, and it is delayed therein for one delay period, emerging at time delta 2. In like fashion the power amplifiers 143 through 147 provide negative output pulses at times delta 3 through delta 7, respectively. There is no delta 8 pulse. Instead, the delta 7 pulse is delayed two delta periods in a delayed pulse amplifier 148, this pulse emerging at delta 9 time. There is one delta period between delta 9 time and delta zero time.

The delta zero pulses from the clock 25 set the single storage circuit, type A 160 in FIG. 1 so that each delta 6 pulse on the line 161 may be passed to the sample line 71 of the instruction register 60. It is recalled that a single storage circuit, type A must be set each time before it is sampled if an output pulse is to be derived. The delta zero pulse from the clock 25 is also used to set a single storage circuit, type A 162 in FIG. 2. Each delta zero pulse conditions the single storage circuit 162 so that it may pass each delta 6 pulse on line 161 to an output conductor 163 which serves to step the time pulse distributor 100.

The delta 1 pulse on the line 24 sets the single storage circuits 16, 17 and 18 of the operation register 10 in FIG. 1. The delta 5 pulse on line 166 is employed to sample the single storage circuit 167. When this single storage circuit has been set previously by a pulse on the conductor 70, the sample pulse at delta 5 time on the conductor 166 is passed to the OR circuit 27 and to a conductor 170 which is effective to operate a storage device not shown and cause new instruction signals to be supplied to the input conductors 11 through 13 of the operation register 10. The output pulse on the conductor 170 is a negative pulse which occurs at delta 6 time. The next instruction data signals are supplied to the conductors 11, 12 and 13 of the operation register at delta 7 time. The negative pulse applied to the OR circuit 27 is delayed 2 time periods as indicated by the symbol D2 in the lower right-hand region thereof. Accordingly, the negative output pulse emerges therefrom at delta 8 time on the conductor 26 and serves to sample the operation register 10. The delay OR circuit 27 may receive a negative pulse on a conductor 171 from a push-button switch not shown. In some instances it may be desirable to energize the conductor 171 under manual control, particularly during initial starting operations.

The delta 6 pulse from the clock 25 is applied to the conductor 161 in FIG. 2 and samples the single storage circuits 160 and 162. Since each of these storage circuits has been set by a delta zero pulse, the delta 6 pulse causes a negative pulse to be established on the lines 163 and 71 at delta 7 time which steps the time pulse distributor 100 and samples the instruction register 60, respectively.

The delta 9 pulse is supplied on a conductor 175 in FIG. 2 to a delayed power amplifier 176 in FIG. 1. A delayed power amplifier provides 2 delta periods of delay. Accordingly, the input pulse at delta 9 time to the delayed power amplifier 176 emerges on the output line 177 at delta 1 time and serves to reset the single storage circuit 167 and thereby inhibit the passage of delta 5 pulses therefrom. This prevents bringing in the next instruction signals until the present instruction is executed.

It is appropriate at this point to return to the OR circuit 130 and follow the sequence of events which take place when the last command pulse of a given instruction emerges therefrom. The last command pulse emerging from the OR circuit 130 occurs at delta 1 time and is applied to a power amplifier 180. An output pulse emerges from this power amplifier at delta 2 time which accomplishes five things.

First, a delayed power amplifier 181 in FIG. 2 is pulsed at delta 2 time, and an output pulse at delta 4 time resets the single storage circuit 162, thereby inhibiting the passage of subsequent delta 6 pulses and preventing the time pulse distributor from being stepped. In essence then the output pulse from the delay power amplifier 181 prevents the time pulse distributor from providing further pulses on the output lines designated TP1 through TP8.

Second, the pulse at delta 2 time from the power amplifier 180 is applied to the reset terminal of time pulse distributor. When the reset terminal is pulsed with a negative pulse, all stages of the time pulse distributor are set to zero except the first stage which is set to one. The time pulse distributor 100 is thus conditioned to begin a new cycle of operation.

Third, the output pulse at delta 2 time from the power amplifier 180 is applied on the conductor 70 to a power amplifier 185 in FIG. 1, and an output pulse therefrom occurs at delta 3 time to reset the single storage circuit 160 and thereby prevent further sample pulses on the conductor 161 from pulsing the sample line 71 of the instruction register 60. This prevents the instruction register 60 from supplying further pulses from the selected single storage circuit, type B to the selected sequence generator.

Fourth, the output pulse at delta 2 time on line 70 is applied to the clear terminals of the single storage circuits 61 through 68 of the instruction register 60. This serves to deselect the single storage circuit which was previously selected by the decoder 40 and which had in turn selected the associated sequence generator in FIG. 2. In essence the executed instruction is deselected.

Fifth, the negative pulse on the conductor 70 is supplied to the single storage circuit 167 at delta 2 time and sets it so that the next sample pulse at delta 5 time on the conductor 166 may be passed to both the OR circuit 27 and the output conductor 170 at delta 6 time. As pointed out earlier, a negative pulse on the output conductor 170 is effective to transfer the next instruction signals at delta 7 time to lines 11, 12 and 13 of the operation register. It is appropriate at this point to follow the sequence of events which may occur in FIGS. 1 and 2 after signals representing an instruction are applied to the operation register 10 in FIG. 1.

Signals representing an instruction are applied to the conductors 11, 12 and 13 of the operation register 10 at delta 7 time. This register was previously set at delta 1 time by a negative pulse on the conductor 24. At delta 8 time a negative pulse is received on the conductor 26, and this pulse gates out the content of the operation register on to the line 32 through 37 at delta 9 time to the decoder 40, three lines being pulsed in every instance when a transfer takes place. Depending upon the combination of signals applied to the decoder 40, one of the lines 50 through 57 is energized at delta 1 time with a negative pulse since the delay through the decoder 40 is equal to 2 delta periods of time. Accordingly, the associated one of the single storage circuits 61 through 68 is set at delta 1 time. There must be no delta 2 pulse on the line 70 to the instruction register 60 at this time because it would deselect the present instruction. Actually there is none, but a delta 2 pulse did occur during the preceding clock cycle which cleared the instruction register preliminary to receiving signals representative of the present instruction.

It was pointed earlier how the last command pulse to the OR circuit 130 in FIG. 2 generated the delta 2 pulse on the line 70 to the instruction register 60 in FIG. 1 upon completion of an instruction. At delta 6 time the conductor 161 in FIG. 2 is energized with a negative pulse which is applied to the single storage circuit 160 in FIG. 1, and an output emerges at delta 7 time as a negative pulse on the conductor 71. This pulse causes the selected single storage circuit in the instruction register 60 to provide a negative output pulse to its associated sequence generator. For illustrative purposes, assume that the single storage circuit 67 is selected. In this case a negative pulse at delta 7 time on the conductor 71 causes the single storage circuit 67 to provide a negative pulse at delta 8 time on the line 86 to the sequence generator 96. The time pulse distributor 100 supplies a negative pulse at delta 8 time on the TP1 input line of the sequence generator 96. The application of these two pulses simultaneously to the sequence generator 96 cause the first command pulse to be generated at this point in the first clock cycle and applied to a first conductor in the cable 116. In order to show that the time pulse distributor 100 provides an output pulse on the TP1 line at delta 8 time, note that the delta 6 pulse on conductor 161 in FIG. 2 is applied to the single storage circuit 162 and an output pulse emerges on the conductor 163 at delta 7 time. This pulse is a negative pulse which steps the time pulse distributor and provides an output pulse on the TP1 line one delta time period later which is delta 8 time.

The clock 25 provides a negative pulse at delta 9 time on the conductor 175 in FIG. 2 to the delay power amplifier 176 in FIG. 1, and the output of this circuit at delta 1 time resets the single storage circuit 167 so that any further delta 5 pulses on the conductor 176 are prevented from establishing negative pulses on the output conductor 170 and to the OR circuit 27. Essentially, this prevents the next instruction signals from being supplied to the operation register until the present instruction has been executed. It also prevents the operation register 10 from being sampled, thereby eliminating the possibility of deselecting the single storage circuit 67 in the instruction register 60.

During the next clock cycle the delta zero pulse sets the single storage circuits, type A, 160 in FIG. 1 and 162 in FIG. 2 as they must be set before the next sample pulse at delta 6 time occurs, or this sample pulse will be ineffective. It is recalled that a single storage circuit, type A destroys the information stored therein when it is sampled, and it must be set before sampled again. The delta 1 pulse sets the single storage circuits 16, 17 and 18 of the operation 10 in FIG. 1 preliminary to receiving the next instruction signals when the present instruction is completed. The pulse at delta 5 time samples the single storage circuit 167 in FIG. 1, but since this circuit was reset by the previous delta 9 signal, which was delayed by the delay power amplifier 176 and applied to the single storage circuit 167 at delta 1 time, the pulse at delta 5 time on the conductor 166 is not passed. At delta 6 time of this clock cycle, the single storage circuit 160 in FIG. 1 is sampled simultaneously with the single storage circuit 162 in FIG. 2. The conductor 71 of the instruction register 60 is energized at delta 7 time again and an output pulse from the selected single storage circuit 67 is provided on the output conductor 86 at delta 8 time to the selected sequence generator 96 in FIG. 2. At delta 7 time a stepping pulse is applied to the time pulse distributor 100 and at delta 8 time the input line designated TP2 is pulsed. The application of pulses simultaneously to the conductor 86 and the conductor designated TP2 generates the second command pulse from the sequence generator 96, and this pulse is applied to a second conductor disposed within the cable 116. At this point two clock cycles are finished and two command pulses generated. It is pointed out that the pulses at delta 1 time, delta 5 time, and delta 9 time from the clock 25 are ineffective to make changes in the operation after the first clock cycle. Only the delta 6 pulses are effective after the first clock cycle, and these pulses cause the time pulse distributor to be stepped and the selected single storage circuit of the instruction register 60 to provide an output pulse. In this instance the single storage circuit 67 of the instruction register 60 supplies a negative pulse on the conductor 86 simultaneously with the output pulse from the time pulse distributor. The delta 6 pulse of the third clock cycle causes the conductor 86 and the input conductor designated as TP3 of the sequence generator 96 to be pulsed simultaneously and thereby generate the third command of this instruction. In like fashion the delta 6 pulse of the fourth clock cycle causes the conductor 86 and the conductor designated as TP4 of the sequence generator to be pulsed and thereby generate the fourth and last command of this instruction. The last command from the sequence generator 96 is applied to the conductor 137 at delta zero time to the OR circuit 130. The output pulse from this OR circuit at delta 1 time is applied to the power amplifier 180, and its output pulse in turn causes the five operations to be performed which were pointed out earlier, namely (1) resetting the single storage circuit 162 to inhibit the passage of further stepping pulses to the time pulse distributor 100, (2) resetting the time pulse distributor for a new cycle of operation, (3) resetting the single storage circuit 160 to prevent further sampling of the instruction register 60, (4) clearing the instruction register 60, and (5) setting the single storage circuit 167 so that the next delta 5 pulse may cause the transfer of the next instruction signals to the operation register 10. When the new instruction signals are supplied to the operation register 10, the foregoing sequence of events may be repeated for the next instruction, and one instruction after another likewise may be executed until a given computer program is completed.

It is seen therefore that a novel control element is provided for generating command pulses to operate a computing device. The instructions cycle may be of variable time duration, resulting in a saving of valuable computer time over the earlier computing device which employed a fixed instruction cycle that had the same time duration for all instructions. Furthermore, the control element of this invention is operated entirely by pulses, and this results in a higher speed of operation and reduces the power consumption over the earlier type of control elements which operated with D.C. levels.

Having finished the description of the system illustrated in FIGS. 1 and 2, it is appropriate at this point to describe in detail the circuits employed in the various blocks illustrated in FIGS. 1 and 2. The operation of the individual circuits or blocks will be understood more clearly by referring to FIGS. 3 to 13 which are schematic diagrams showing the component parts and the manner in which they are interconnected to perform the various functions. In each instance the circuits are responsive to negative pulses and the common reference potential or ground may be regarded as positive. In the absence of specific reference to positive pulses, all pulses are assumed to be negative. It will be understood by those skilled in the art that this particular manner of establishing polarities and reference potentials can be varied as the situation demands, and the embodiments illustrated are by way of example only and are not intended to restrict the mode of operation of the circuitry shown. Since the overall philosophy of the system has been described previously, it is not believed necessary to observe any specified order in describing the individual blocks, and they will be described in an arbitrary sequence which is neither indicative of their importance to the system or the order in which they operate.

FIG. 3 is a diagram of the pulse source for the "clock" of the system. This pulse source comprises a Hartley-type oscillator, a buffer-shaper and an inverter connected in serial fashion. Transistor 301 which as its collector 303 connected to source of negative potential —V through a resistor 305 forms the heart of the oscillator stage. The emitter element 307 is regeneratively coupled through resistor 309 to an intermediate point on inductance 311. Inductance 311 is connected in parallel with a variable capacitor 313, and this combination forms the frequency determining portion of the circuit. The D.C. bias on base element 315 is established by resistors 317 and 319. A condenser 321 serves to block the D.C. power supply from the emitter circuit.

The buffer-shaper stage is normally staturated and transistor 323 is conducting. The output pulses from transistor 301 periodically turn off transistor 323 and cause output pulses to be induced in winding 325 of transformer 327. The pulses in winding 325 are sharper than those obtained from collector 303 of transistor oscillator 301, which are somewhat rounded in form. The pulses, thus shaped, are amplified by transistor 329 and inverted by transformer 331. The pulses appearing on output line 333 are therefore properly shaped negative pulses whose repetition rate is controlled by the frequency of oscillation of transistor 301.

The operation of the basic OR circuit can be seen from FIG. 4. This circuit comprises two input lines 335 and 337 which are connected to the base elements 339 and 341 of transistors 343 and 345, respectively. The emitter elements 347 and 349 are grounded through resistors 351 and 353. The collector elements 355 and 357 are connected in parallel and feed the primary winding 359 of transformer 361. The other end of primary winding 359 is connected to a source of negative potential —V. Secondary winding 363, which has a resistor 365 connected in parallel therewith, serves as the output of the basic OR circuit, the output pulses appearing on line 367.

In operation a pulse appearing on either or both input lines 335 and 337 will cause an output pulse to appear on line 367. For example, a pulse apearing on input line 335 will negatively bias base 339 of transistor 343 and turn on the transistor, since emitter 347 is at ground potential. When transistor 343 is turned on, a current will result in primary winding 359, and when this current is cut off by the termination of the input pulse, an output pulse will result on line 367 through transformer 361. Similarly, an input pulse on line 337 would produce the same result, as would also the simultaneous occurrence of input pulses on lines 335 and 337.

FIG. 5 shows the same basic OR circuit as that of FIG. 4 with the addition of a pair of delay networks in the inputs of the transistors. Series inductances 369 and 371 have capacitances 373 and 375 shunted to ground to constitute LC delay networks. Since the only difference between this circuit and that of FIG. 4 is the fixed delay introduced in the input to each transistor, it is not believed necessary to discuss the operation of this circuit in detail.

Figure 6:
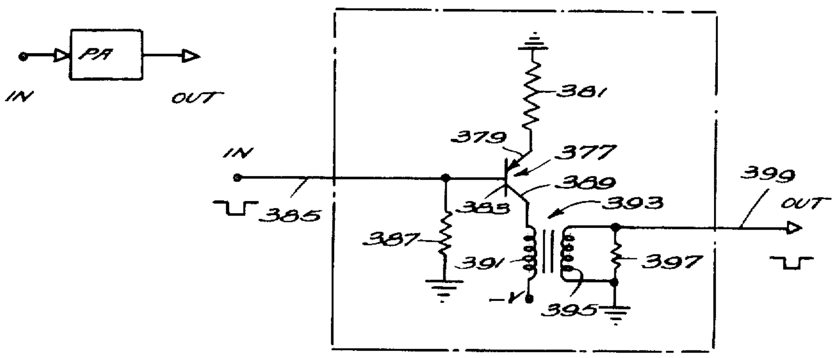
FIG. 6 shows a circuit diagram of the pulse amplifier used in FIGS. 1 and 2.

FIG. 6 is a schematic diagram of the basic pulse amplifier used in the system. This circuit comprises a transistor 377 having its emitter 379 grounded through resistor 381. Base element 383 is connected directly to input line 385 and maintained at a potential difference from ground by resistor 387. Collector element 389 is connected to a source of negative potential —V through the primary winding 391 of transformer 393. The secondary winding 395 of transformer 393 has a resistor 397 connected in parallel therewith, and lead 399 from a secondary winding 395 constitutes the output line of this circuit.

An input pulse appearing on line 385 will negatively bias the base element 383 of transistor 377. The emitter element 379 is at ground potential while the collector element 389 is at the potential of the negative source —V. Consequently, an input pulse on line 385 will cause the transistor to conduct, and by proper choice of circuit components and operating potentials, the input pulse will be amplified. The amplified pulse will appear on output line 399.

Figure 7:
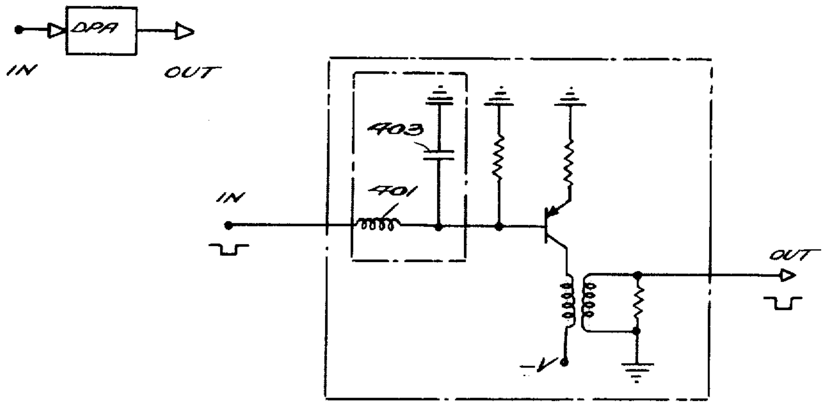
FIG. 7 is a circuit diagram showing a delayed pulse amplifier illustrated in FIGS. 1 and 2.

FIG. 7 is a schematic diagram of a pulse amplifier with a delay introduced. The circuit shown here is identical to that of FIG. 6 with the exception that a delay network comprising inductance 401 and capacitance 403 has been added. This delay network is similar to those shown in FIG. 5.

Figure 8:
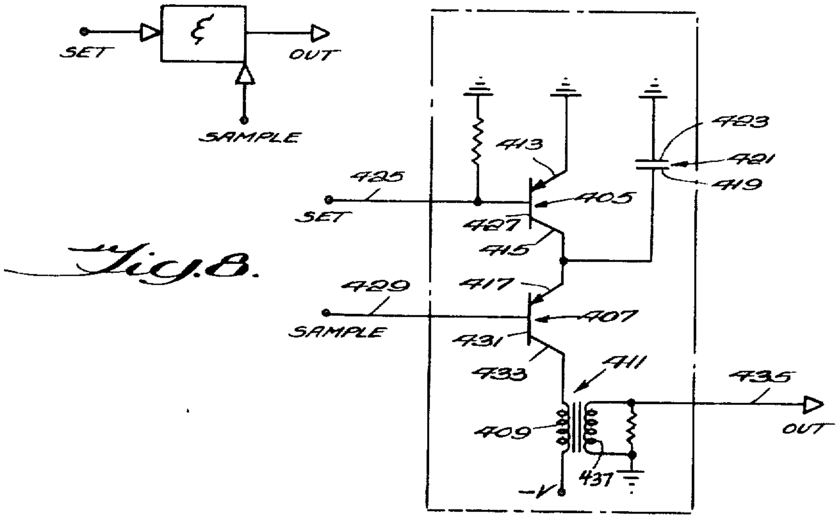
FIG. 8 illustrates a time buffer AND circuit shown in block form in FIG. 1.

The details of the basic time-buffer AND circuit are shown in FIG. 8 of the drawings. This circuit comprises a pair of transistors 405 and 407 which are connected in series with the primary winding 409 of transformer 411. One end of primary winding 409 is connected to a source of negative potential —V. The emitter element 413 of transistor 405 is grounded. The collector element 415 is connected to emitter element 417 of transistor 407, and also to plate 419 of capacitor 421. The other plate 423 of capacitor 421 is grounded. The set input is received on line 425 which is connected to base 427 of transistor 405. The sample input is received on line 429 which is connected to base 431 of transistor 407.

Assuming that condenser 421 is not charged, plate 419 will be at ground potential and an input pulse on line 425 will have no effect on the circuit since there is no potential difference across transistor 405. If condenser 421 were charged, then plate 419 would be negative with respect to ground potential, and an input pulse on line 425 would turn on the transistor, since a potential difference would then exist across transistor 405. In this instance turning on transistor 405 merely serves to discharge condenser 421 so that the end result of either situation is that condenser 421 will be discharged. A subsequent input pulse on line 429 will bias the base element 431 of transistor 407 negatively and produce conduction through transistor 407 since emitter 417 is at ground potential and collector 433 is at the potential of the negative source. When transistor 407 conducts, an output pulse will be obtained on line 435 from the secondary 437 of transformer 411. This action will also charge up condenser 421 such that a further input to line 429 would fail to produce an output pulse because collector 433 and emitter 417 would be at substantially the same potential. In order to get additional output pulses, condenser 421 must be discharged by an input pulse on line 425 as described previously. Thus it can be seen that an output is obtained from this circuit only when input lines 425 and 429 are sequentially pulsed.

Figure 9:
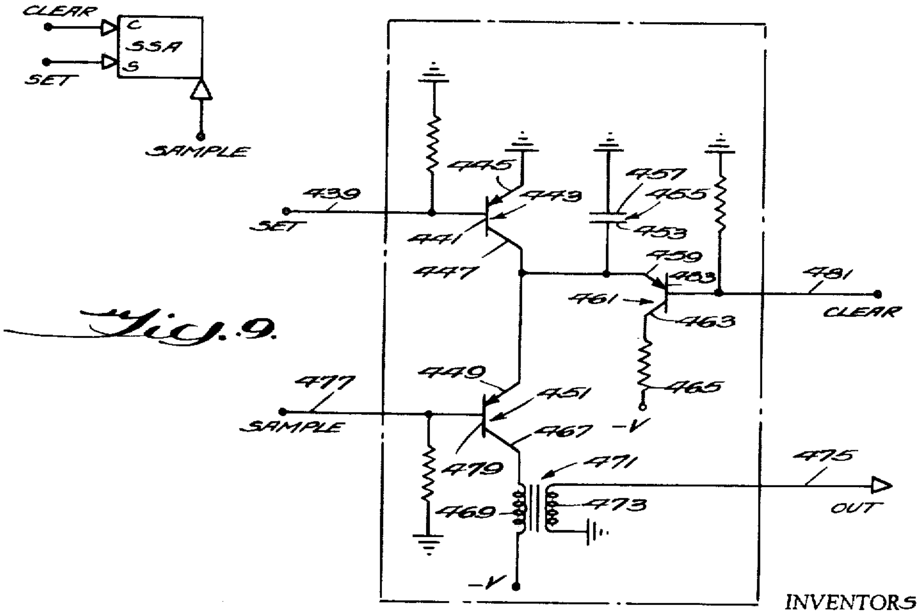
FIG. 9 illustrates in detail a circuit diagram for a single storage circuit type A employed in block form in FIGS. 1 and 2.
Figures 10, 11:
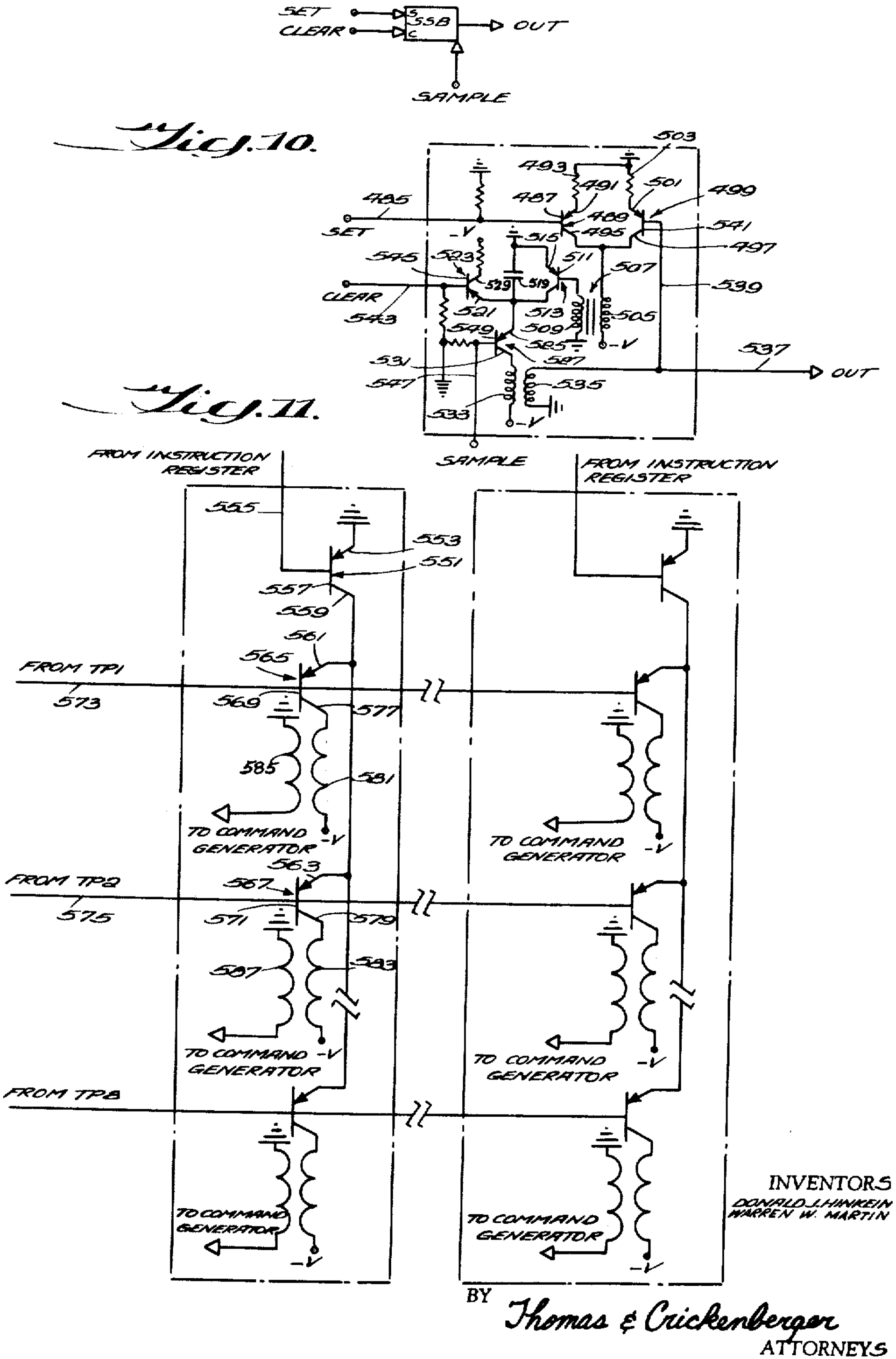
FIG. 10 is a circuit diagram illustrating in detail a single storage circuit type B illustrated in block form in FIG. 1.
FIG. 11 illustrates the details of the sequence generators shown in block form in FIG. 2.

The single storage circuits of the system are shown in FIGS. 9 and 10 in which FIG. 9 illustrates the type A circuit and FIG. 10 illustrates the type B circuit. The basic difference between these two types of circuits is that in the type A circuit only one output pulse can be obtained from a sample pulse without resetting the circuit, while in the type B circuit an indefinite number of output pulses may be obtained upon repetitive sampling.

In FIG. 9 the set input line 439 feeds into the base element 441 of transistor 443. The emitter element 445 is grounded. Collector element 447 is connected to the emitter 449 of a second transistor 451. Collector 447 is also connected to a plate 453 of capacitor 455, the other plate 457 of which is grounded. The emitter 459 of a third transistor 461 is connected to elements 447, 449 and 453. Collector element 463 is connected to a source of negative potential —V through a resistor 465, collector 467 of transistor 451 is connected to a source of negative potential —V through the primary winding 469 of transformer 471. The secondary 473 of transformer 471 provides the output line 475 for the circuit. The sample input line 477 is connected to the base 479 of transistor 451, and the clear input line 481 is connected to the base element 483 of transistor 461.

In operation a negative input pulse on set line 439 will bias base element 441 of transistor 443 negatively. If condenser 455 is not charged then collector 447 and emitter 445 are at the same potential and the transistor will not conduct. If condenser 455 is charged such that plate 453 is more negative than ground potential, the transistor will conduct and condenser 455 will be discharged. After an input pulse on set line 439 has assured that condenser 455 will be discharged, a subsequent pulse on sample line 477 will bias negatively the base element 479 of transistor 451. Transistor 451 will then conduct since emitter 449 is at ground potential and collector 467 is at the potential of the negative source —V. When transistor 451 conducts, an output pulse is obtained on line 475 through transformer 471. If it is desired to clear the circuit after a pulse has been received on set line 439, this may be accomplished by pulsing the clear line 481. A pulse on line 481 baises negatively the base element 483 of transistor 461, and since emitter 459 is at ground potential because condenser 455 is not charged, transistor 461 will conduct and charge condenser 455. When condenser 455 is charged then emitter 449 of transistor 451 is at approximately the same potential as its collector element 467. Thus if sample line 477 is then pulsed, no output will be obtained. It will be seen from this description that an output pulse can be obtained only after the circuit is conditioned by a set pulse and then sampled by a sample pulse. The set pulse condition may be erased by pulsing the clear line 481, in which case a subsequent sample pulse would not yield an output pulse.

The model B single storage circuit of FIG. 10 is similar in many ways to the circuit of FIG. 9 but this configuration employs a feedback loop which reconditions the circuit by discharging the condenser element such that the circuit may be repeatedly sampled. Set input line 485 is connected to the base element 487 of transistor 489. Emitter 491 is grounded through resistor 493. Collector 495 of transistor 489 is connected to collector 497 of transistor 499, the emitter 501 of which is grounded through a resistor 503. Collector elements 495 and 497 are connected to a source of negative potential —V through winding 505 of transformer 507. A second winding 509 of transformer 507 is connected to the base element 511 of transistor 513. Emitter element 515 is grounded. Collector element 517 is connected to a capacitor 519, emitter 521 of transistor 523 and emitter 525 of transistor 527. The collector 529 of transistor 523 is connected to a source of negative potential as is the collector 531 of transistor 527. Winding 533 through which collector 531 is connected to source —V is coupled to winding 535 from which lead 537 serves as the output line. A lead 539 connected to output lead 537 feeds into base element 541 of transistor 499. Clear input line 543 feeds into base 545 of transistor 523, and sample input line 547 feeds into base 549 of transistor 527.

A negative input pulse on set line 485 will bias base element 487 of transistor 489 and cause conduction since emitter 491 is at ground potential and collector 495 is at the potential of source —V. This conduction will cause a current in winding 505 which will produce a pulse in winding 509. The pulse in winding 509 will bias base element 511 of transistor 513, and if condenser 519 is charged, transistor 513 will conduct and dissipate the charge on condenser 519. If condenser 519 is discharged then nothing will take place. Since condenser 519 is discharged after set line 485 has been pulsed, a subsequent pulse on sample line 547 will bias negatively the base element 549 of transistor 527 and cause conduction since emitter 525 is at ground potential and collector 531 is at the potential of negative source —V. When transistor 527 conducts, condenser 519 is charged and an output pulse is obtained on output line 537. This output pulse is used to bias the base element 541 of transistor 499 and cause conduction. When transistor 499 conducts, a current will appear in winding 505 of transformer 507, thus causing an output pulse in winding 509 which biases base 511 of transistor 513 and turns on transistor 513. When transistor 513 conducts, condenser 519 is discharged and so the output pulse has served to recondition the circuit so that subsequent sample pulses will produce corresponding output pulses without repulsing the set line. If at any time it is desired to clear the circuit, the clear input line 543 is pulsed. A negative pulse on line 543 turns on transistor 523 when condenser 519 is discharged, and the current through transistor 523 recharges condenser 519 to effectively block the sampling operation.

Referring now to FIG. 11, the operation of the sequence generators will be explained. The showing here is incomplete as indicated by the broken lines, since it is not necessary to show all of the generators, or all of the stages of a single generator to understand the operation thereof. A transistor 551 having a grounded emitter element 553 has an input 555 to its base element 557 from an appropriate source in the instruction register. The collector element 559 is connected to emitter elements 561 and 563 of transistors 565 and 567. The base elements 569 and 571 of transistors 565 and 567 are energized by negative pulses from the time pulse distributor on lines 573 and 575. Collector elements 577 and 579 are connected to a source of negative potential —V through windings 581 and 583, respectively.

A negative pulse on either line 573 or 575 would tend to turn on the associated transistor, but since the emitter elements are essentially floating with respect to the negative source, such action will not occur until a pulse from the instruction register appears on line 555 simultaneously with the appearance of a pulse on lines 573 or 575. When the pulses occur simultaneously a conduction path is completed from ground through emitter 553, collector 559, emitter 561, collector 577 and winding 581 to source —V. Thus, the simultaneous occurrence of pulses from the time pulse distributor and instruction register will cause an output pulse on windings 585 or 587 which are connected to the command generator.

It will be understood that any number of stages may be connected in parallel in a sequence generator, and any number of sequence generators may be energized by the instruction register. The detailed description has been confined to two stages of one sequence generator, but it is believed that the cumulative operation of these circuits will be obvious.

Figure 12:
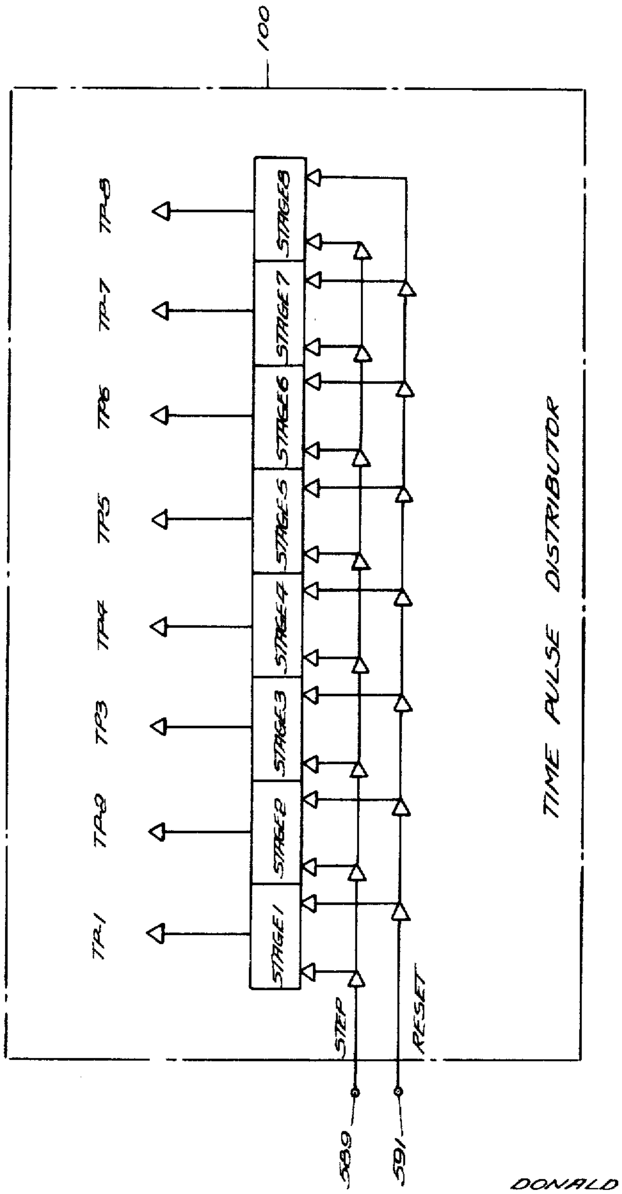
FIG. 12 illustrates a time pulse distributor shown in block form in FIGS. 1 and 2.

The time pulse distributor 100 of the system is shown in FIG. 12 in block form. The distributor shown comprises 8 stages connected in serial fashion, although it will be understood that a greater or lesser number of stages may be employed as the situation demands. The specific circuitry of the stages is not shown, and any conventional circuitry may be employed to accomplish the desired result. For example, a time pulse distributor circuit which may be utilized is disclosed in the co-pending application of William N. Carroll and Donald J. Hinkein entitled "Time Pulse Distributor" and filed on May 29, 1959.

In the block diagram of FIG. 12 stages 1 through 8 each has an input from the step line 589 and the reset line 591. A plurality of outputs TP1 through TP8 are provided, which carry the time pulses to the appropriate inputs on the sequence generators, as shown in FIG. 11.

In operation a pulse on the reset line 591 will set stage 1 to the one condition and all other stages to the zero condition. An input pulse on the step line 589 will then produce an output pulse from stage 1 on output line TP1. As stage 1 produces an output pulse, this pulse also conditions stage 2 so that a subsequent step pulse on line 589 will produce an output pulse from stage 2 on line TP2. This process is repeated in serial order until all of the stages have been pulsed or the time pulse distributor is reset. The transistor circuitry disclosed in the above-mentioned co-pending application is well adapted to perform these functions, and the detailed operation will be understood by making reference to this application.

Figure 13:
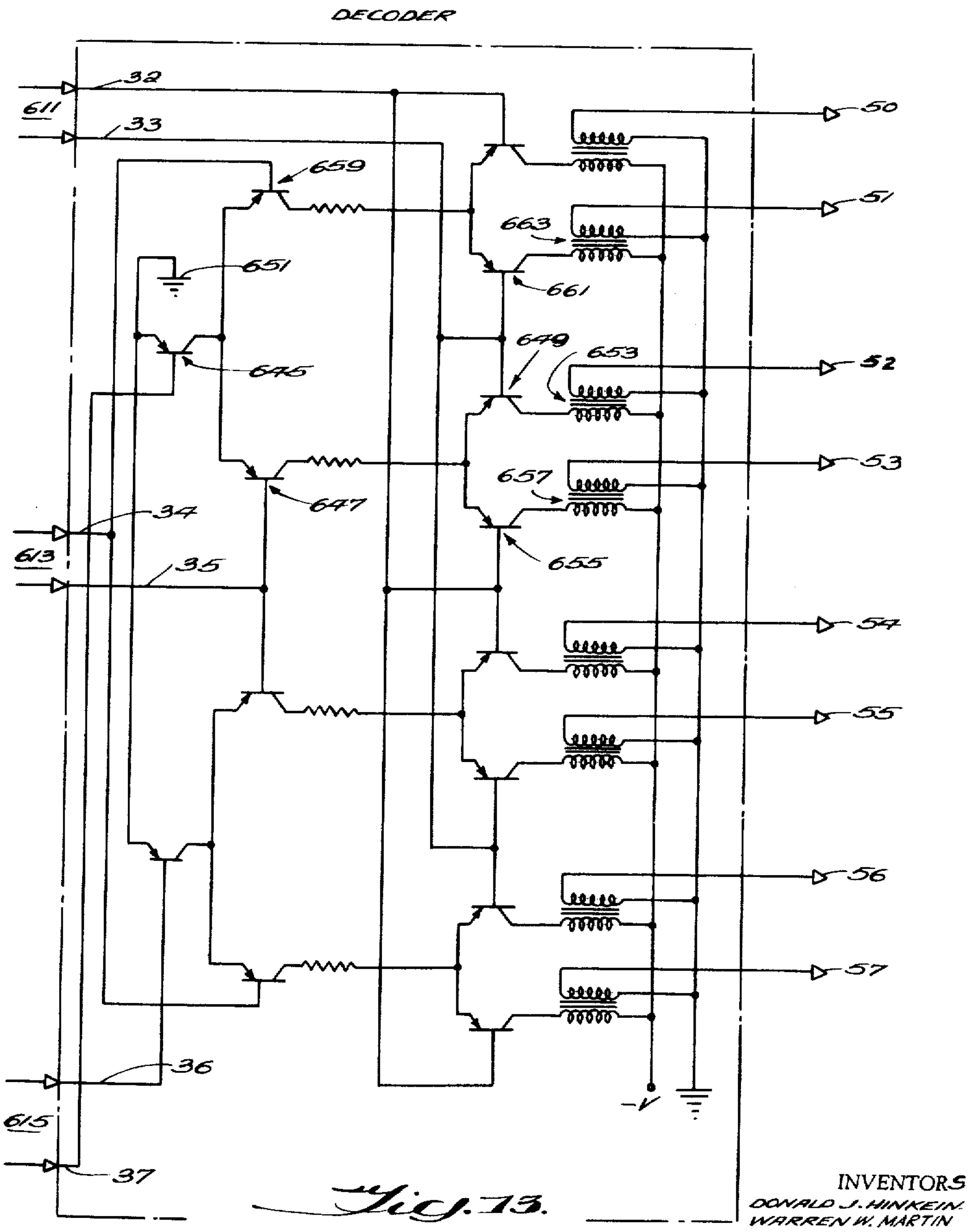
FIG. 13 is a circuit diagram showing the details of the decoder illustrated in block form in FIG. 1.

FIG. 13 is a schematic diagram of the decoder which is shown in block form in FIG. 1. The decoder has three pairs of inputs 611, 613 and 615. Each input consists of a one line and a zero line, respectively. The one lines are denoted by the numerals 32, 34 and 36, while the zero lines are noted by the numerals 33, 35 and 37. Since each input represents a binary digit, there will be eight possible outputs, and these outputs denoted by the numerals 50 through 57. The actual operation of the circuit will be understood more easily by referring to the table below and following through for particular values. In order to simplify the table, the one and zero notation for the particular inputs has been retained so that the conventional binary number will be recognizable.

| Input 615 (Sign Bit) | Input 613 (Bit 1) | Input 611 (Bit 2) | Output Line Energized |
|---|---|---|---|
| 0 | 0 | 0 | 52 |
| 0 | 0 | 1 | 53 |
| 0 | 1 | 0 | 51 |
| 0 | 1 | 1 | 50 |
| 1 | 0 | 0 | 55 |
| 1 | 0 | 1 | 54 |
| 1 | 1 | 0 | 56 |
| 1 | 1 | 1 | 57 |

To follow through the operation of the decoder, the binary number 000 which is shown in the first place of the above table will be traced. The binary number 000 appearing at inputs 611, 613 and 615 would mean that leads 33, 35 and 37 would be pulsed. A pulse on line 37 would negatively bias the base of transistor 645 and enable this transistor to conduct. The simultaneous pulse on line 35 would bias the base of transistor 647 and also enable this transistor to conduct. The pulse on line 33 conditions transistor 649 for conduction and a complete path is now obtained from ground 651 through transistors 645, 647, 649 and transformer 653 to output line 52.

The binary number 001 appears at the input to the decoder as negative pulses on lines 32, 35 and 37. The pulse on line 37 conditions transistor 645; the pulse line 35 conditions transistor 647; and the pulse on line 32 conditions transistor 655. A complete path is then opened from ground 651 through transistors 645, 647, 655 and transformer 657 to negative source —V. Thus, a binary 001 input results in the energizing of line 53.

An input of the binary number 010 would result in negative pulses appearing on lines 33, 34 and 37. This means that transistors 645, 659 and 661 will be conditioned for conduction. Conduction takes place from ground 651 through transistors 645, 659, 661 and transformer 663 to the negative source —V, resulting in an output on line 51.

It will be obvious from the above table and the three examples following through therefrom as to how the remaining output lines are energized.

It will be appreciated by those persons skilled in the art that the detailed circuitry described above may be replaced by equivalent circuits which perform the same function. Therefore, the invention is not limited to any specific circuit construction but rather is directed to the novel cooperation of the various functional circuits as set forth in the following claims.

What is claimed is:

1. A device for generating signals on lines which operate a data processing machine including a decoder having a plurality of input lines and a plurality of output lines, register means to supply various combinations of signals to the plurality of input lines of the decoder, said decoder energizing a selected output line in response to a given combination of signals applied to the input lines thereof, a plurality of sequence generators connected to the plurality of output lines of the decoder, each sequence generator having a plurality of gates which are conditioned by the selected output line of the decoder, and time pulse generator means for sequentially interrogating the plurality of gates and providing an output signal from each gate to a load device to be operated, the last gate interrogated in each sequence generator having its output connected to a load device and to an OR circuit, the output of the OR circuit serving to clear the register means and reset the time pulse generator means and change the combination of signals to the register means.

2. A pulse operated control element for a computing device including a plurality of pulse operated sequence generators, each sequence generator having a plurality of gates with each gate having an output command line, a separate individual input and one input common to all gates, means responsive to pulse signals representative of a given instruction for selecting one of the sequence generators and periodically pulsing the input common to all gates therein, means for sequentially energizing the separate individual inputs of the gates in the selected sequence generator in synchronism with the periodic pulses applied to the common input thereof, whereby all output command lines of the gates in a selected sequence generator are pulsed.

3. The apparatus of claim 2 wherein the number of gates in one or more sequence generators is different from the number of gates in other sequence generators whereby the time it takes to execute one instruction may vary from that of another instruction.

4. The apparatus of claim 2 wherein means is provided which responds to the output pulse from the last gate in each sequence generator and automatically terminates the current instruction and initiates the next instruction.

5. A pulse operated control element for a computing device comprising an operation register for receiving and transferring information pulses, a decoder connected to said operation register and having a plurality of output lines which are selectively energized in accordance with said transferred information pulses from said operation register, an instruction register connected to said decoder for storing signals received from the decoder, a plurality of sequence generators connected to said instruction register, each sequence generator having a plurality of gates with the number of gates in one or more sequence generators being different from the number of gates in other sequence generators whereby the number of commands it takes to execute one instruction may vary from that of another instruction, a time pulse distributor having a plurality of outputs connected to the gates of said sequence generators, said sequence generators being operative upon the simultaneous reception of pulses from said instruction register and said time pulse distributor to produce command pulses for performing computer operations, and means connected to said sequence generators for resetting said time pulse distributor, clearing said instruction register and initiating information pulses to said operation register upon the termination of said command pulses from each sequence generator whereby the current instruction is terminated and the next instruction is initiated.

6. A device for generating signals on lines which operate a data processing machine including a decoder having a plurality of input lines and a plurality of output lines, first register means to supply various combinations of signals to the plurality of input lines of the decoder, said decoder energizing a selected output line in response to a given combination of signals applied to the input lines thereof, second register means having a plurality of input lines and a plurality of output lines, one of each of the plurality of output lines of said decoder being connected to one of each of said input lines to said second register means, a plurality of sequence generators connected to the plurality of output lines of the second register means, each sequence generator having a plurality of gates which are conditioned by a selected output line of the second register means, and time pulse generator means for sequentially interrogating the plurality of gates and providing an output signal from each gate to a load device to be operated, the last gate interrogated in each sequence generator having its output connected to a load device and to an OR circuit, the output of the OR circuit serving to clear the two register means and reset the time pulse generator means and change the combination of signals to the first register means.

7. The device of claim 6 wherein the number of gates in the individual sequence generators depend upon the number of commands required for the instruction which is performed by such sequence generator.

8. The apparatus of claim 6 wherein means is provided which responds to the output pulse from the last gate in each sequence generator and automatically terminates the current instruction and initiates the next instruction.

References Cited in the file of this patent

UNITED STATES PATENTS 2,914,248 Ross et al. ------------- Nov. 24, 1959